United States Patent [19]

Farr

[11] 4,320,623
[45] Mar. 23, 1982

[54] FLUID-PRESSURE OPERATED BOOSTERS FOR VEHICLE BRAKING SYSTEMS

[75] Inventor: Glyn P. R. Farr, Leek Wootton, England

[73] Assignee: Girling Limited, Birmingham, England

[21] Appl. No.: 184,140

[22] Filed: Sep. 4, 1980

Related U.S. Application Data

[63] Continuation of Ser. No. 5,786, Jan. 23, 1979, abandoned, which is a continuation of Ser. No. 799,263, May 23, 1977, abandoned.

[30] Foreign Application Priority Data

May 21, 1976 [GB] United Kingdom ............... 20988/76

[51] Int. Cl.³ ............................................. B60T 13/00
[52] U.S. Cl. ................................... 60/547 R; 60/551; 60/554; 91/382
[58] Field of Search ...................... 60/547 R, 548, 552, 60/553, 555, 551, 593, 594; 91/368, 382; 92/33; 74/99 I, 110; 251/229, 251; 303/114

[56] References Cited

U.S. PATENT DOCUMENTS

| 2,098,666 | 11/1937 | La Brie | 60/551 |
| 2,229,247 | 1/1941 | Kamenarovic | 60/555 |
| 2,934,042 | 4/1960 | Stelzer | 60/551 |
| 3,319,925 | 5/1967 | Koichi Kejima | 92/33 |
| 3,664,130 | 5/1972 | Meyers | 303/114 |
| 3,989,223 | 11/1976 | Burkhardt | 92/33 |
| 4,050,434 | 9/1977 | Zlikowski | 91/391 R |

Primary Examiner—Abraham Hershkovitz
Attorney, Agent, or Firm—Scrivener, Clarke, Scrivener and Johnson

[57] ABSTRACT

In a servo-motor assembly for a vehicle braking system a valve controlling the servo pressure is operated by an operating assembly comprising an angularly movable rotary operating member, an axially movable transmission member for applying an operating force to the rotary member, and a camming mechanism for translating axial movement of the transmission member into angular movement of the rotary member.

10 Claims, 3 Drawing Figures

FLUID-PRESSURE OPERATED BOOSTERS FOR VEHICLE BRAKING SYSTEMS

SPECIFIC DESCRIPTION

This application is a continuation of application Ser. No. 5,786, filed Jan. 23, 1979 now abandoned which is a continuation of application Ser. No. 799,263, filed May 23, 1977 now abandoned.

This invention relates to fluid-pressure operated servo-motor assemblies for vehicle braking systems of the kind in which an effort from pedal-operated input member is transmitted to an output member through a movable wall in a housing and, when the servo-motor is operated, the effort is augmented by a fluid-operating pressure applied to the movable wall and controlled by valve means responsive to relative movement between parts of the assembly.

In one known assembly of the kind set forth in which the operating pressure is hydraulic and is supplied by a high pressure source, for example pump or hydraulic accumulator, the movable wall comprises a piston working in a bore in the housing and the pressure is applied to one end of the piston. In such a construction ideally the valve means should be located in a part of the assembly which is stationary, otherwise a moving connection, for example a hose, or seals under hydraulic pressure, will be required.

It has been proposed to utilise a lever to operate the valve means, in which the lever is pivoted about the valve means by means of a pivot to enable the valve means to be situated at a fixed location. In such a construction the travel of the input and output members differ by an amount determined by their respective distance from the pivot for the lever. Thus when the hydraulic fluid is cold, the input and output members travel together and then separate as the pressure applied to the movable wall increases. This applies an uncomfortable "kick back" to the pedal.

According to our invention in a servo-motor assembly of the kind set forth for a vehicle braking system the valve means is located in a stationary part of the housing, and is operated by an operating assembly comprising an angularly movable rotary operating member, an axially movable transmission member for applying an operating force to the rotary member, and camming means for translating axial movement of the transmission member into angular movement of the rotary member.

The provision of the operating assembly enables the valve means to be situated at a fixed location without the provision of a lever. This ensures that the travel of the input member and the output member will be the same.

Axial movement of the transmission member to cause angular movement of the rotary member is opposed by a reaction from a member or part on which the output member acts, for example the piston of an hydraulic master cylinder, so that the reaction provides a signal for operating the valve means and is transmitted to the pedal through the operating assembly. This means that the servo-motor assembly can be defined as being "output reactive."

Preferably the transmission member and the rotary member are in the form of pressure plates in adjacent faces of which are provided complementary inclined ramps with a ball co-operating with each pair of ramps in the plates. The ramp and the balls are arranged so that axial movement of the transmission member towards the rotary member forces the balls relatively down the ramps and into recesses to cause the angular movement of the rotary member.

In one construction the housing comprises axially movable parts which are keyed against relative rotation and the pressure plate forming the transmission member is slidably keyed to the one part of the housing in which the valve means is located and is carried by the other part of the housing, the pressure plate comprising the rotary member being disposed between the transmission member and an abutment at an adjacent end of the said one part, the arrangement being such that axial movement of the housing parts away from each other to urge the pressure plates together causes angular movement of the rotary member to occur.

In another construction the housing is of unitary construction and the input member extends through the movable wall being keyed against rotation with respect to the housing and being provided at its inner end with a pressure face, and the output member is itself rotatable and is provided at the end adjacent to the input member with a thrust receiving face, the balls being located between the ramps which are provided in the adjacent faces so that, as the input member is advanced in an axial direction relative to the output member the movement of which is opposed by a reaction force, the balls ride down into the recesses to cause angular movement of the rotary member.

Preferably the valve means comprises a piston working in a radial bore in the housing and of which the innermost end is acted upon by the rotary member to urge the piston relatively outwardly initially to close an outlet port for connection to a reservoir and thereafter to open an inlet port for connection to source of fluid under pressure, which causes such fluid to be applied to the movable wall.

Two embodiments of our invention are illustrated in the accompanying drawings in which.

Figure 1:
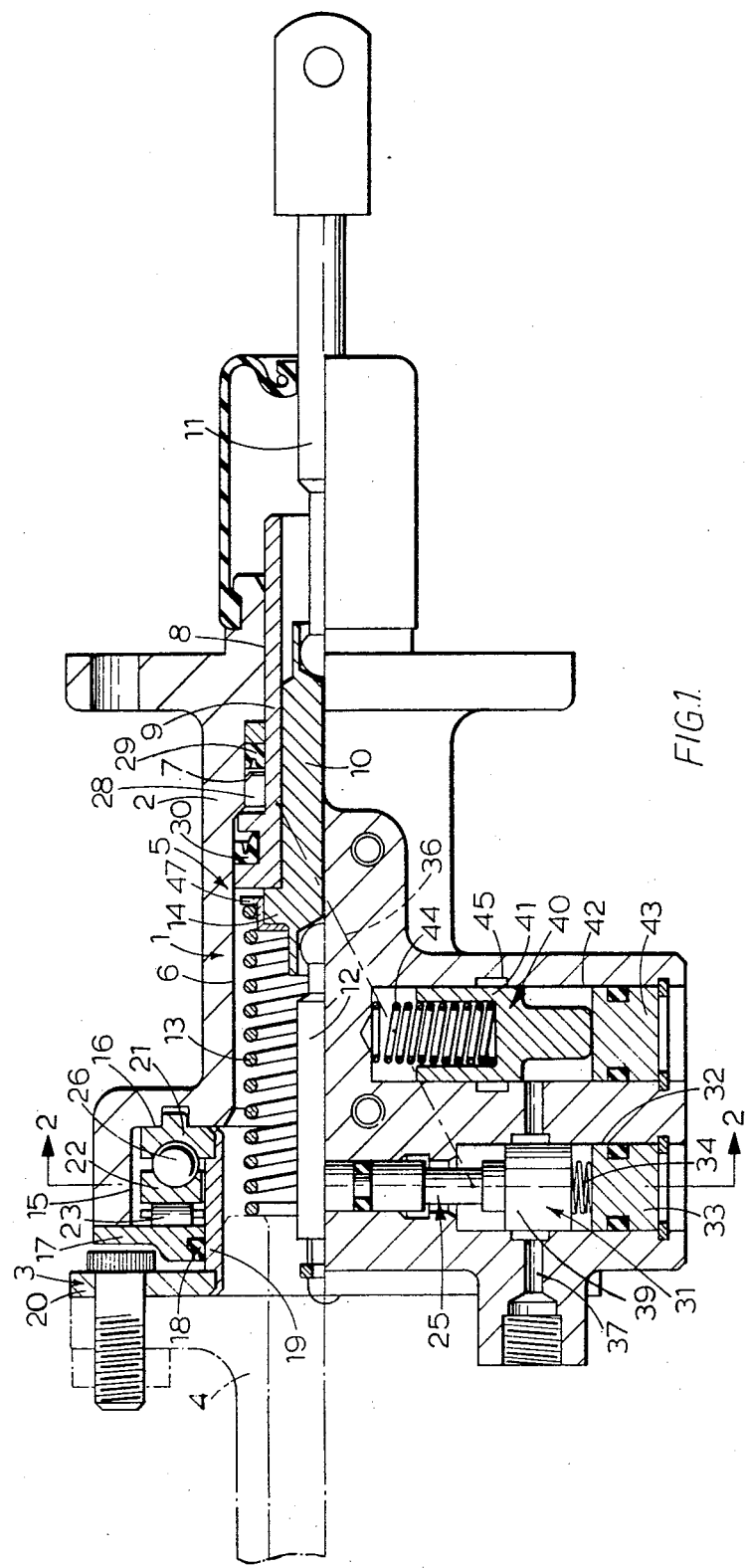
FIG. 1 is a section on the line 1—1 of a servo-motor assembly illustrated in FIG. 2.
Figure 2:
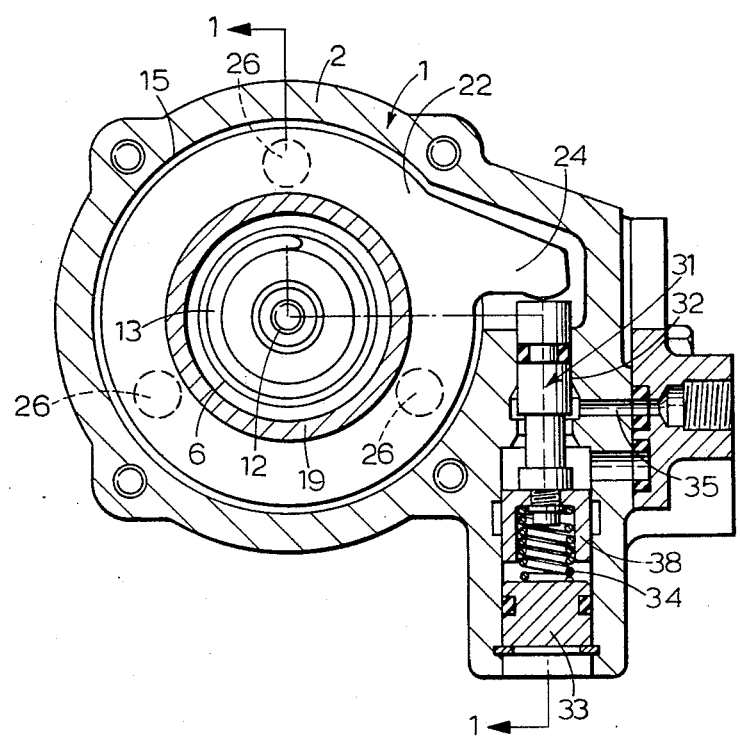
FIG. 2 is a section of the line 2—2 of FIG. 1.

The servo-motor illustrated in FIGS. 1 and 2 of the accompanying drawings comprises a housing 1 having a main body part 2 and a second body part 3 which is axially movable with respect to the main body part 2 and which provides a mounting for the body 4 of a master cylinder shown in chain-dotted outline.

The main body part 2 is provided with an open-ended longitudinally extending bore 5 having bore portion 6, 7 and 8 of progressively smaller diameter.

A stepped boost piston 9 working in the bore portion 7 and 8 is of tubular outline to form a guide for a reaction piston 10 on opposite ends of which act a pedal-operated input member 11 and an output member 12 for operating the master cylinder.

In the inoperative retracted position shown in the drawings a return spring 13 acting between the body 4 and an abutment 47 on the reaction piston 10 urges the larger end portion of the piston 9 into engagement with a shoulder at the step in diameter between the bore portions 6 and 7 by means of an enlarged head 14 acting on the adjacent inner end of the piston 9.

The bore portion 6 is counterbored at 15 to define an annular chamber disposed between a shoulder 16 at the step in diameter between the bore portion 6 and the counterbore 15 and an inwardly directed annular flange 17 carrying a lip seal 18.

The body part 3 comprises a cylindrical extension 19 at the inner end of an annular member 20.

The extension 19 works through the lip seal 18 and at its inner end carries an annular plate 21 which is keyed against rotation with respect to the body part 2.

A second rotatable annular plate 22 is disposed between the plate 20 and a thrust bearing 23 in abutment with the flange 17, and the plate 22 is provided with a radial valve-operating projection 24 for controlling operation of valve means 25. Balls 26 are located between complementary ramps 27 in the plates and normally are at the top of the ramps with the plates spaced apart.

The valve means 25 control the application of pressure from a servo to a boost chamber 28 which is defined in the bore 5 between a seal 29 through which the smaller diameter portion of the piston 9 works and a seal 30 carried by the greater diameter portion. As illustrated the valve means comprises a piston assembly 31 of differential outline working in a stepped radial bore 32 in the body port 2 with the outer end of greater diameter closed by a plug 33 and a spring 34 urging the piston assembly 31 inwardly into engagement with the projection 24. Normally a port 35 for connection to a reservoir for hydraulic fluid is in communication with the boost chamber 28 through a passage 36 and a port 37 for connection to a source of fluid under pressure, for example a pump or hydraulic accumulator, is closed by the portion 39 of the piston assembly 31 which is of greater diameter.

When the servo-motor assembly is operated a force applied to the reaction piston 10 from a pedal is transmitted through output member 12 to the master cylinder where it is resisted by the friction of the seal on the piston of the master cylinder. Since the friction of the seal 18 is less, the body 4 of the master cylinder moves away from the housing 1 taking the housing part 3 with it. This, in turn, causes the plate 21 to move axially towards the flange 17. Since the flange 17 is relatively fixed the balls 26 are forced down the ramps and into recesses thereby causing the rotary plate 22 to rotate and urge the piston assembly 31 in a radially outwards direction against the loading in the spring 34. Initial movement of the piston assembly 31 in this direction closes the port 35 to isolate the reservoir from the booster chamber 28 and thereafter opens the port 37 so that high pressure fluid from the source is supplied to the boost chamber 28 to augment the input force from the pedal.

The servo-pressure in the boost chamber 28 is transmitted to the reaction piston 10 through the head 14 and, in turn, exerts a force on the operating assembly comprising the plates 21 and 22 and the balls 26 substantially equal to the force generated by the reaction from the master cylinder, which in turn is equal to the sum of the force from the input portion 10 and the boost piston 9.

When the input force is relieved the pressure in the boost chamber 28 acts, with the assistance of the spring 34, to urge the piston assembly in the opposite direction to close the port 37 and open the port 35. Thereafter the spring 13 acts to return the master cylinder and the rotary plate 22 to their initial positions.

Preferably the piston 31 is of two part construction with the parts connected through a lost-motion connection. Specifically a longer diameter portion 38 controls the port 37 to ensure an adequate flow of fluid when the piston assembly 31 is moved outwardly.

In a modification a by-pass valve for a power-steering pump comprising a spool 40 of differential outline is connected in parallel with the valve means 25 and has a larger diameter portion 41 working in a sealed radial bore 42 which is blind and which is of constant diameter throughout its axial length and a smaller diameter end portion normally engaging with a plug 43 at the open end of the bore 42 through the action of a compression spring 44. That end of the spool 41 is exposed at all times to the pressure source so that, when the servo-motor assembly is inoperative, the spool 41 is urged inwardly to expose a port 45 connected to a steering mechanism so that fluid from the source is supplied thereto.

The opposite end of the spool 41 is inserted in the passage 36 so that, when the servo-motor assembly is operated, both ends of the spool are subjected to equal pressures so that, because of the loading in the spring 44, the spool is urged outwardly to close the port 45 and provide priority to the booster chamber 28 from the source.

Figure 3:
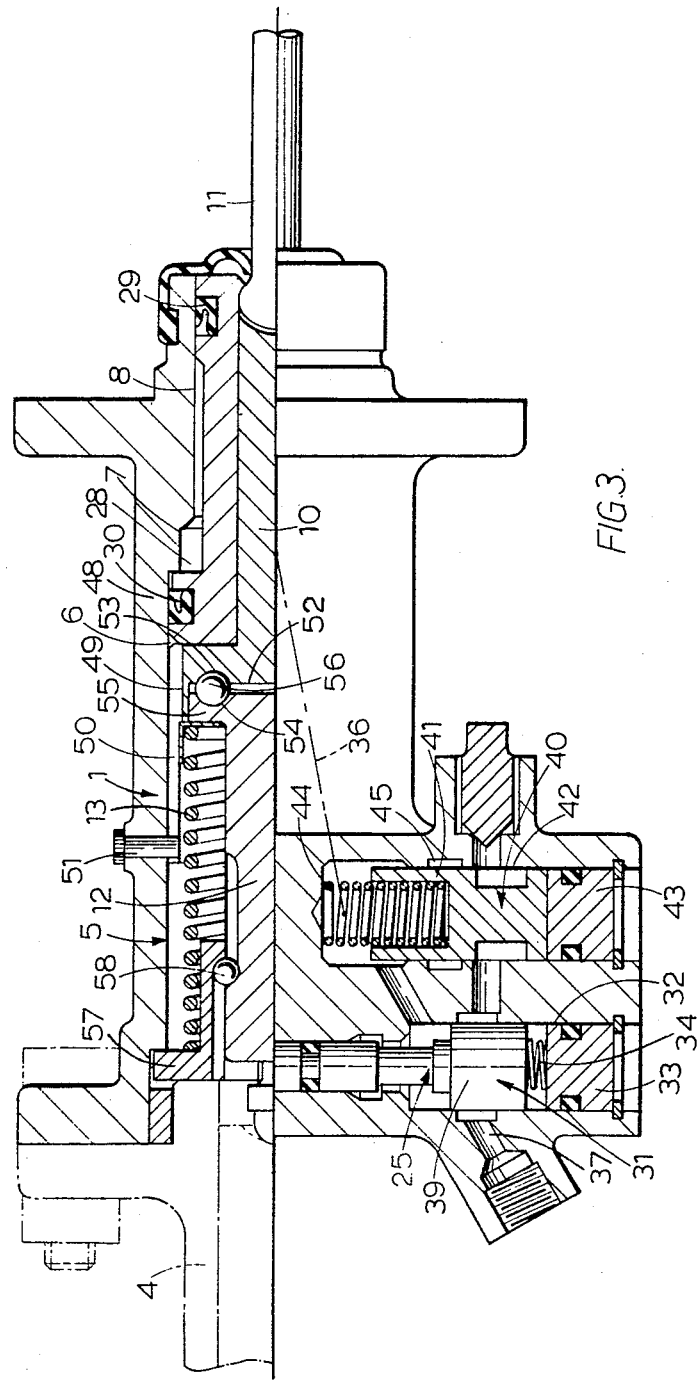
FIG. 3 is a section similar to FIG. 2 of a modified servo-motor assembly.

In the embodiment of FIG. 3 the housing 1 is of unitary construction comprising a single body part and the master cylinder is bolted rigidly to one end thereof. The reaction piston 10 is provided with a forward extension in the form of a cylindrical skirt 49 provided with a longitudinal slot 50 in which a peg 51 is slidably received to hold the piston 10 against rotation. A face 52 at the end of the piston 10 is provided with ramps 53 and complementary ramps 54 are provided in an enlarged head 55 at the adjacent end of the output member 12. Balls 56 are located between pairs of adjacent ramps.

A member 57 for operating the valve means 25 is located at the inner end of the bore 5 in abutment with the adjacent end of the body 4 of the master cylinder, and the member 57, apart from forming an abutment for the spring 13, is also coupled to the output member 12 through a ball and friction less spline arrangement 58. This allows the output member 12 to move angularly with respect to the piston 10 and axially with respect to the member 57 as the member 57 is moved angularly to operate the valve means.

Thus, axial movement of the piston 10 in an inward direction in response to operation of the pedal causes the output member 12 and the member 57 to move angularly and operate the valve means 25 with relative angular movement between the face 52 and the head 54 being accommodated by the spline arrangement 58.

The construction and operation of the embodiment of FIG. 3 is otherwise the same as that of FIGS. 1 and 2 and corresponding reference numerals have been applied to corresponding parts.

Although, in the embodiments described above the servo-motor assembly is operated from a supply of hydraulic fluid under pressure, in other constructions the servo-motor assembly may equally well be operated pneumatically.

I claim:

1. A servo-motor assembly for a vehicle braking system comprising a housing having a bore, a pedal-operated input member and a movable wall working in said bore, an output member upon which said movable wall acts, said input and output members being co-axial, and both being axially movable in said bore, means defining a boost chamber in said bore, and valve means for controlling the flow of pressurized fluid into said boost chamber to act on said movable wall, a valve operating mechanism comprising a valve actuating member, means mounting said actuating member for angular movement about the longitudinal axis of said bore, and means for moving said actuating member angularly to operate said valve means in response to axial movement of said input member in a brake applying direction with respect to said bore.

2. A servo-motor assembly as claimed in claim 1, wherein travel of said output member in an axial direction is substantially equal to the travel of said input member in said axial direction.

3. A servo-motor assembly for a vehicle braking system comprising a housing having a bore, an output member and a pedal-operated input member working in said bore, means through which an effort from said input member is transmitted to said output member, said means comprising a movable wall working in said bore, means for applying a fluid-operating pressure to said movable wall to augment said effort, and valve means located in said housing for controlling said fluid-operating pressure applying means, wherein said operating assembly for operating said valve means comprises an angularly movable rotary operating member, and an axially movable transmission member for applying an operating force to said rotary member, said transmission member and said rotary member being in the form of pressure plates in adjacent faces of which are provided complementary inclined ramps having recesses, a ball co-operating with each pair of said ramps in said plates, said ramps and said balls comprising means arranged so that axial movement of said transmission member towards said rotary member forces said balls relatively down said ramps and into said recesses to cause angular movement of said rotary member.

4. A servo-motor assembly as claimed in claim 3, wherein a part on which said output member acts comprises means providing a reaction opposing axial movement of said transmission member to cause angular movement of said rotary member to operate said valve means said reaction being transmitted to the pedal through said operating assembly.

5. A servo-motor assembly as claimed in claim 4, wherein said part comprises a piston of an hydraulic master cylinder.

6. A servo-motor assembly as claimed in claim 3, wherein said housing comprises axially movable first and second parts which are keyed against relative rotation and said pressure plate forming said transmission member is slidably keyed to said first part in which said valve means is located and is carried by said second part, said first part of said housing having an abutment adjacent to that pressure plate which comprises said rotary member said rotary member being disposed between said transmission member and said abutment, said ramp and ball arrangement causing angular movement of the rotary member on axial movement of the housing parts away from each other to urge the pressure plates together.

7. A servo-motor assembly as claimed in claim 3, wherein said housing is of unitary construction and said input member extends through said movable wall being keyed against rotation with respect to said housing and being provided at its inner end with a pressure face, and said output member is itself rotatable and forms a part of said rotary member and is provided at the end adjacent to said input member with a thrust receiving face, said balls being located between said ramps which are provided in said adjacent faces and the arrangement comprising means acting so that as said input member is advanced in an axial direction relative to said output member, said balls ride down into said recesses to cause angular movement of said rotary member, and a reaction force comprises means opposing movement of said output member.

8. A servo-motor assembly as claimed in claim 7, wherein a second part of said rotary member comprises a valve operating member slidably coupled to said output member, the arrangement comprising means allowing said output member to move axially with respect to said valve operating member, and angular movement of said output member comprising the means for causing angular movement of said valve operating member.

9. A servo-motor as claimed in claim 3, wherein said housing has a radial bore in which an outlet port for connection to a reservoir and an inlet port for connection to a source of fluid under pressure are located, said valve means comprises a piston working in said radial bore of which the innermost end is acted upon by said rotary member to urge said piston relatively outwardly initially to close said outlet port and thereafter to open said inlet port and cause said fluid under pressure to be applied to said movable wall.

10. A servo-motor assembly as claimed in claim 9, wherein said rotary member has a valve operating projection and said piston is of differential outline, having an outer end of greater diameter which closes said inlet port when said valve means is in an operative position, and resilient means act on said piston to urge it into engagement with said valve-operating projection.

* * * * *